US011221635B2

(12) United States Patent
Feng

(10) Patent No.: US 11,221,635 B2
(45) Date of Patent: Jan. 11, 2022

(54) AERIAL VEHICLE HEADING CONTROL METHOD AND APPARATUS AND ELECTRONIC DEVICE

(71) Applicant: AUTEL ROBOTICS CO., LTD., Guangdong (CN)

(72) Inventor: Yinhua Feng, Guangdong (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 182 days.

(21) Appl. No.: 16/434,514

(22) Filed: Jun. 7, 2019

(65) Prior Publication Data

US 2019/0285433 A1    Sep. 19, 2019

Related U.S. Application Data

(63) Continuation of application No. PCT/CN2017/107377, filed on Oct. 23, 2017.

(30) Foreign Application Priority Data

Dec. 9, 2016  (CN) .......................... 201611127903.1

(51) Int. Cl.
G05D 1/10       (2006.01)
G01C 23/00      (2006.01)
G05D 1/02       (2020.01)

(52) U.S. Cl.
CPC ........... G05D 1/101 (2013.01); G01C 23/005 (2013.01); G05D 1/0202 (2013.01); B64C 2201/027 (2013.01)

(58) Field of Classification Search
CPC .... G05D 1/101; G05D 1/0202; G01C 23/005; B64C 2201/027
See application file for complete search history.

(56) References Cited

U.S. PATENT DOCUMENTS 5,552,983 A * 9/1996 Thornberg ........... G05D 1/0033
                                                 180/167
6,092,007 A * 7/2000 Cotton ................. G05D 1/0204
                                                 244/181

(Continued)

FOREIGN PATENT DOCUMENTS

CN       104180796 A     12/2014
CN       105573330 A      5/2016

(Continued)

OTHER PUBLICATIONS

International Search Report dated Jan. 19, 2018; PCT/CN2017/107377.

Primary Examiner — Nicholas Kiswanto

(57) ABSTRACT

The present disclosure provides an aerial vehicle heading control method, to conveniently and effectively adjust a heading of an aerial vehicle. The aerial vehicle heading control method includes: obtaining a heading angle of an aerial vehicle; obtaining a direction angle of a working bench; calculating a heading adjustment angle of the aerial vehicle according to the heading angle of the aerial vehicle and the direction angle of the working bench; and adjusting a heading of the aerial vehicle according to the heading adjustment angle of the aerial vehicle. Therefore, the current heading angle of the aerial vehicle and the current direction angle of the working bench are calculated and the heading of the aircraft is adjusted, so that the aerial vehicle can conveniently adjust the heading based on a current orientation of the working bench.

14 Claims, 7 Drawing Sheets

(56) References Cited

U.S. PATENT DOCUMENTS

| | | | | |
|---|---|---|---|---|
| 7,286,913 B2* | 10/2007 | Bodin | ............... | G05D 1/0044 |
| | | | | 382/106 |
| 8,594,862 B2* | 11/2013 | Callou | ............... | B64C 39/024 |
| | | | | 701/2 |
| 8,676,406 B2* | 3/2014 | Coffman | ............ | G05D 1/0016 |
| | | | | 701/3 |
| 9,891,705 B1* | 2/2018 | Lahr | ................. | G06K 9/2054 |
| 10,569,874 B2* | 2/2020 | Zhang | ............... | G05D 1/0011 |
| 2015/0346721 A1 | 12/2015 | Werner et al. | | |
| 2018/0046179 A1* | 2/2018 | Choi | ................ | B64C 39/024 |

FOREIGN PATENT DOCUMENTS

| | | |
|---|---|---|
| CN | 105573334 A | 5/2016 |
| CN | 105992980 A | 10/2016 |
| CN | 106774390 A | 5/2017 |

* cited by examiner

Aerial vehicleRemote control

Aerial vehicleMobile phone terminal

Aerial vehicleRemote control

Mobile phone terminal

AERIAL VEHICLE HEADING CONTROL METHOD AND APPARATUS AND ELECTRONIC DEVICE

CROSS REFERENCE TO RELATED APPLICATIONS

The present application is a continuation of International Application No. PCT/CN2017/107377, filed on Oct. 23, 2017, which claims priority to Chinese Patent Application No. 201611127903.1, filed on Dec. 9, 2016 and entitled "AERIAL VEHICLE HEADING CONTROL METHOD AND APPARATUS AND ELECTRONIC DEVICE", both of which are incorporated herein by reference in their entireties.

BACKGROUND

Technical Field

The present application relates to the field of aerial vehicle control and in particular, to an aerial vehicle heading control method and apparatus and an electronic device.

Related Art

An unmanned aircraft is briefly referred to as a "drone" and also referred to as an unmanned aerial vehicle, which can be operated by using a self-provided device or a wireless remote control. At present, drones are widely used. Increasing consumer-grade drones are being produced. For flight control of the drone, a flight attitude and a flight height of the aircraft can be controlled and takeoff and landing of the aircraft can also be controlled.

A person that controls flight of the aircraft is referred to as a drone pilot. For operation on the drone, the drone pilot is required to have relatively professional operation skills, to better control a flight direction and the attitude of the aircraft. The drone pilot usually controls flight of the aerial vehicle by using a drone remote control.

In the prior art, the drone pilot controls flight of the drone based on mainly operation experience and by using a remote control. For a professional drone pilot, it is not easy to operate an aerial vehicle, let alone a general pilot beginner.

The inventor finds in a process of implementing embodiments of the present application that in an actual flight process, a user often adjusts the drone by using a position at which the user stands as a basic standard and often performs some commonly used operations, for example, turning left or right at a right angle and turning round. Currently, there is no method for the user to very conveniently perform the foregoing operations.

In addition, in the actual flight process, after the drone takes off, each pilot usually expects the drone to fly right ahead the pilot. When a direction of a drone nose is misaligned, the pilot adjusts an orientation of the aircraft nose by using a remote control after the aircraft takes off. For a current solution, in a particular environment, use is inconvenient. After taking off each time, in a normal case, the drone inertially flies right ahead. If the orientation of the nose is not right ahead, a lever on the remote control is pushed ahead, which causes the aircraft to fly toward the left or right or backward. When the pilot finds that a direction is incorrect, the pilot needs to stop to adjust the orientation of the nose, which affects flight experience and affects flight safety.

SUMMARY

A technical problem to be resolved by embodiments of the present application is providing an aerial vehicle heading control method, to conveniently and effectively adjust a heading of an aerial vehicle. The aerial vehicle heading control method includes:

obtaining a heading angle of an aerial vehicle;

obtaining a direction angle of a working bench;

calculating a heading adjustment angle of the aerial vehicle according to the heading angle of the aerial vehicle and the direction angle of the working bench; and adjusting a heading of the aerial vehicle according to the heading adjustment angle of the aerial vehicle.

The embodiments of the present application further provide an aerial vehicle heading control apparatus, to conveniently and effectively adjust a heading of an aerial vehicle. The aerial vehicle heading control apparatus includes:

a heading angle obtaining unit, configured to obtain a heading angle of an aerial vehicle;

a working bench position obtaining unit, configured to obtain a direction angle of a working bench; and an angle calculation unit, configured to calculate a heading adjustment angle of the aerial vehicle according to the heading angle and the direction angle of the working bench.

The embodiments of the present application further provide an electronic device, including at least one processor; and a memory connected to the at least one processor, where the memory stores an instruction program that can be executed by the at least one processor and the instruction program is executed by the at least one processor, so that the at least one processor is used for the aerial vehicle heading control method.

According to the aerial vehicle heading control method and apparatus and the electronic device that are provided in the embodiments of the present application, the current heading angle of the aerial vehicle and the current direction angle of the working bench are calculated and the heading of the aircraft is adjusted, so that the aerial vehicle can conveniently adjust the heading based on a current orientation of the working bench.

DETAILED DESCRIPTION

To make the objectives, the technical solution and the advantages of the present application clearer, the following further describes the present application in detail with reference to the accompanying drawings and embodiments. It should be understood that the specific embodiments described herein are only used to explain the present application, rather than limit the present application.

An aerial vehicle heading control method provided in the embodiments of the present application may be performed in any suitable type of user terminal or operation terminal that includes a user interaction apparatus and a processor has an operation capability, for example, a desktop computer, a smartphone, a tablet computer, a remote control and other user terminals.

A working bench provided in the embodiments of the present application may be any control terminal that can be used to control an aerial vehicle, for example, a desktop computer, a smartphone, a tablet computer, a remote control and other user terminals.

An aerial vehicle heading control device in the embodiments of the present application may be used as a software or hardware function unit independently configured in user terminals, or may be used as a function module integrated in a processor, to perform the aerial vehicle heading control method in the embodiments of the present application.

Embodiment 1

Figure 1:
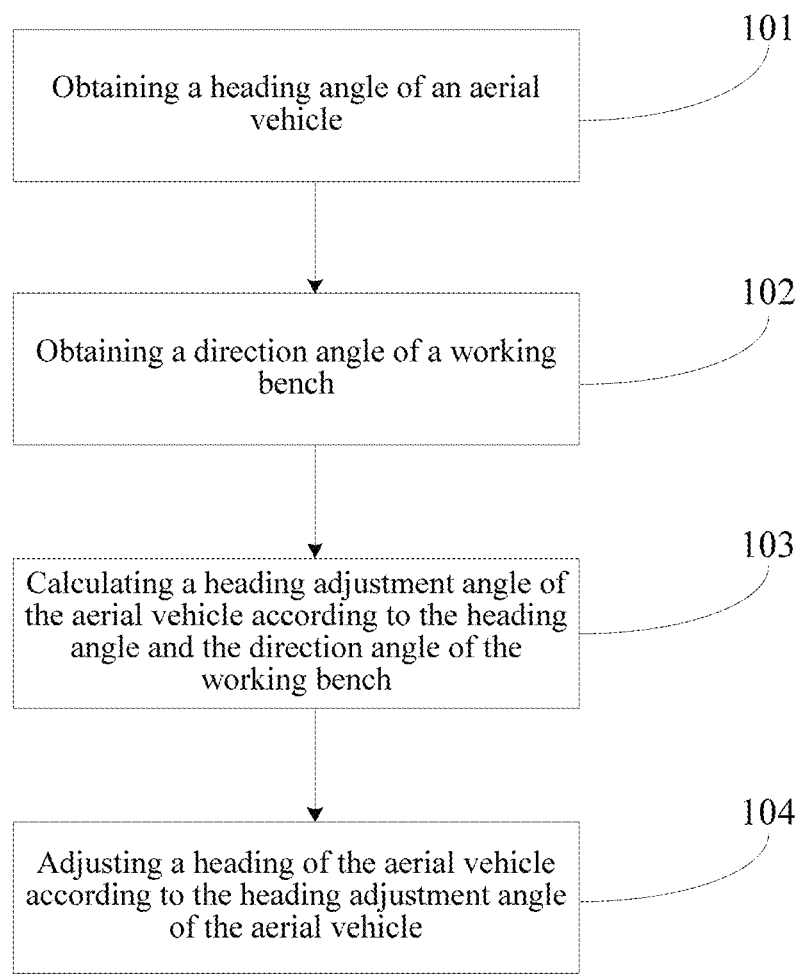
FIG. 1 is a flowchart of an aerial vehicle heading control method according to Embodiment 1 of the present application.

Embodiment 1 of the present application provides an aerial vehicle heading control method, as shown in FIG. 1. The aerial vehicle heading control method includes the following steps.

Step 101: Obtaining a heading angle of an aerial vehicle.

The aerial vehicle records attitude information thereof during takeoff or during flight. The attitude information is usually included in GPS information and usually includes data in three directions (Yaw, Roll and Pitch). Yaw is rotation around a Y axis and is also referred to as a heading angle. Roll is rotation around a Z axis and is also referred to as a roll angle. Pitch is rotation around an X axis and is also referred to as a pitch angle.

The aerial vehicle sends the attitude information thereof to a working bench. The working bench extracts Yaw data as a heading angle of the aerial vehicle.

Alternatively, the aerial vehicle includes a compass, which records a direction angle of a nose relative to the compass. The aerial vehicle sends the angle to the working bench as the heading angle.

The aerial vehicle may send the heading angle thereof to the working bench in a real-time sending manner. In such a manner, the working bench can master flight information of the aerial vehicle in real time.

The aerial vehicle may alternatively send the heading angle thereof to the working bench in a periodic sending manner. In such a manner, occupation of a processor of the aerial vehicle can be reduced, processing efficiency can be improved and energy can be saved.

The aerial vehicle may alternatively send the heading angle thereof to the working bench in a request sending manner. In such a manner, when a user triggers a heading adjustment request, the working bench sends a heading angle request to the aerial vehicle. After receiving the heading angle request, the aerial vehicle returns the heading angle to the working bench. In such a manner, the heading angle of the aerial vehicle is obtained only when needed, which can reduce information exchange between the working bench and the aerial vehicle and save system resources.

Step 102: Obtaining a direction angle of a working bench.

The direction angle of the working bench is usually an angle of an orientation of the front of the working bench or a pilot. The working bench is equipped with a built-in GPS or compass. The direction angle Degree may be directly obtained from GPS information. Alternatively, the current direction angle Degree may be obtained according to the compass.

Step 103: Calculating a heading adjustment angle of the aerial vehicle according to the heading angle and the direction angle of the working bench.

Through the heading angle Yaw of the aerial vehicle minus the direction angle Degree of the working bench, the working bench obtains an angle difference therebetween. The angle difference is used as the heading adjustment angle of the aerial vehicle.

Certainly, alternatively, through the direction angle Degree of the working bench minus the heading angle Yaw of the aerial vehicle, the working bench may obtain the angle difference therebetween. The angle difference is used as the heading adjustment angle of the aerial vehicle.

Any calculation manner does not affect adjustment. During adjustment, only adjustment directions are different.

Step 104: Adjusting a heading of the aerial vehicle according to the heading adjustment angle of the aerial vehicle.

Whether the heading of the aerial vehicle needs to be adjusted is determined according to the heading adjustment angle of the aerial vehicle. When the angle difference is 0, it indicates that directions of the direction angle and the heading angle are consistent and the heading of the aerial vehicle does not need to be adjusted. When the directions of the direction angle and the heading angle are inconsistent, the heading of the aerial vehicle is adjusted.

When in step 103, when the heading angle Yaw of the aerial vehicle minus the direction angle Degree of the working bench obtains the angle difference therebetween, the heading of the aerial vehicle is counterclockwise adjusted according to the heading adjustment angle of the aerial vehicle when the heading adjustment angle of the aerial vehicle is a negative value; and the heading of the aerial vehicle is clockwise adjusted according to the heading adjustment angle of the aerial vehicle when the heading adjustment angle of the aerial vehicle is a positive value.

When in step 103, when the direction angle Degree of the working bench minus the heading angle Yaw of the aerial vehicle obtains the angle difference therebetween, the heading of the aerial vehicle is counterclockwise adjusted according to the heading adjustment angle of the aerial vehicle when the heading adjustment angle of the aerial vehicle is a positive value; and the heading of the aerial vehicle is clockwise adjusted according to the heading adjustment angle of the aerial vehicle when the heading adjustment angle of the aerial vehicle is a negative value.

According to this embodiment of the present application, the current heading angle of the aerial vehicle and the current direction angle of the working bench are calculated and the heading of the aircraft is adjusted, so that the aerial vehicle can conveniently adjust the heading based on a current orientation of the working bench rather than a current orientation of the aerial vehicle, which facilitates operation of the pilot and very conveniently implements commonly used adjustment on the heading of aerial vehicle.

Embodiment 2

Figure 2:
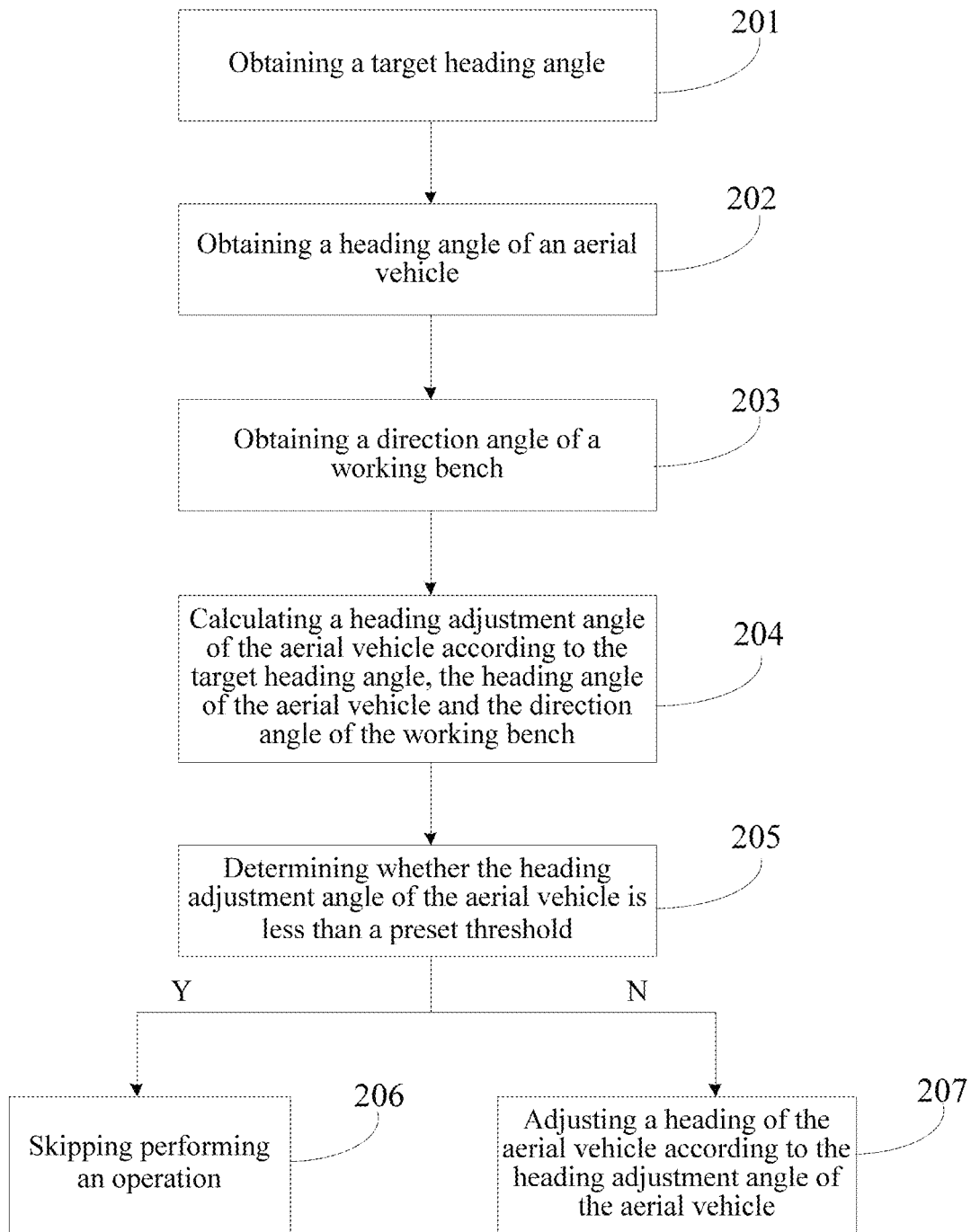
FIG. 2 is a flowchart of an aerial vehicle heading control method according to Embodiment 2 of the present application.

Embodiment 2 of the present application provides another aerial vehicle heading control method, as shown in FIG. 2. The aerial vehicle heading control method includes the following steps.

Step 201: Obtaining a target heading angle.

In a flight process of an aerial vehicle, the following flight actions are often executed by a pilot on the aerial vehicle, namely, common operations such as going straight relative to a working bench, turning left 90 degrees relative to the working bench, turning right 90 degrees relative to the working bench and turning round relative to the working bench. The operations are often adjusted based on a current orientation of the pilot. In this case, the working bench first obtains the target heading angle for which the pilot expects the aerial vehicle to be adjusted. The target heading angle may be obtained by using a button preset on the working bench or by using a UI interface, which allows a user to enter data of the target heading angle.

The target heading angle is an angle difference that the user expects between an orientation of the aerial vehicle and an orientation of the working bench. In a system, the target heading angle is a positive angle when adjustment needs to be clockwise performed toward the working bench; and the target heading angle is a negative angle when adjustment needs to be performed counterclockwise.

Step 202: Obtaining a heading angle of an aerial vehicle.

When the working bench obtains the target heading angle, it indicates that the working bench needs to adjust a heading of the aerial vehicle. The heading angle of the aerial vehicle may be obtained in the manner in step 101.

Step 203: Obtaining a direction angle of a working bench.

Operation of the step is completely the same as that of step 102 in Embodiment 1. Details are not described herein again.

Step 204: Calculating a heading adjustment angle of the aerial vehicle according to the target heading angle, the heading angle of the aerial vehicle and the direction angle of the working bench.

In this embodiment, the user enters the target heading angle for which the user expects the aerial vehicle to be adjusted in-position. When the heading adjustment angle of the aerial vehicle is calculated, the target heading angle needs to be considered. Therefore, the heading adjustment angle of the aerial vehicle needs to be obtained through the target heading angle plus the heading angle of the aerial vehicle minus the direction angle of the working bench.

Step 205: Determining whether the heading adjustment angle of the aerial vehicle is less than a preset threshold.

To avoid frequent adjustment of the heading of the aerial vehicle, heading adjustment information may be determined. When an adjustment value thereof is less than a threshold, for example, five degrees, the heading of the aerial vehicle is not adjusted; and when the adjustment value is greater than or equal to the specified threshold, the heading of the aerial vehicle is adjusted.

The threshold is preset in the system; certainly, the user may reset the threshold through a setting operation.

Step 206: Skipping performing an operation.

When the heading adjustment angle of the aerial vehicle is less than the preset threshold, adjustment is canceled and no operation is performed.

Step 207: Adjusting a heading of the aerial vehicle according to the heading adjustment angle of the aerial vehicle.

When the heading adjustment angle of the aerial vehicle is greater than the preset threshold, the heading of the aerial vehicle is adjusted according to the adjustment angle. A specific adjustment manner is similar to that in step 104. Details are not described herein again.

According to Embodiment 2 of the present application, the target heading angle is added, which increases selections of adjustment of the heading of the aerial vehicle and more facilitates operation of the pilot. In addition, the adjustment threshold is set, to avoid the frequent adjustment of the heading of the aerial vehicle and benefit flight stability of the aerial vehicle.

Embodiment 3

Figure 3A:
FIG. 3A is a schematic diagram of an aerial vehicle heading control method according to Embodiment 3 of the present application.
Figure 3A:
Figure 3B:
FIG. 3B is a schematic diagram of another aerial vehicle heading control method according to Embodiment 3 of the present application.
Figure 3B:
Figure 3C:
FIG. 3C is a schematic diagram of a third aerial vehicle heading control method according to Embodiment 3 of the present application.
Figure 3C:
Figure 3C:
Figure 4A:
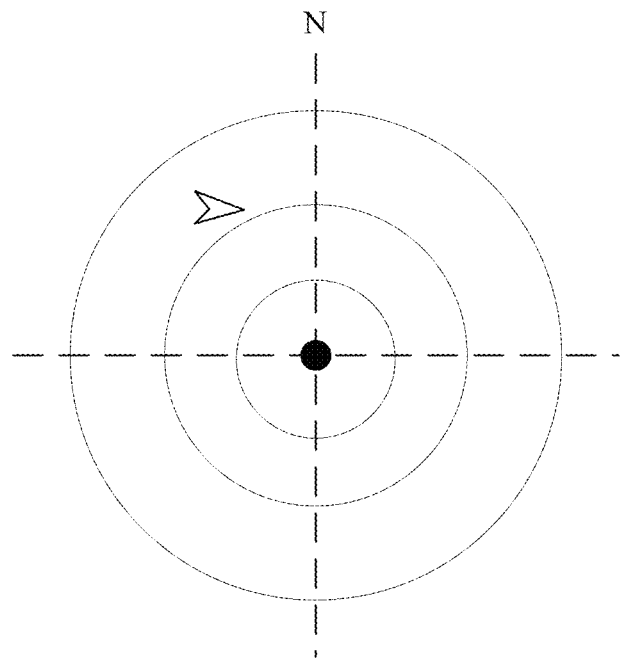
FIG. 4A is a schematic diagram of adjusting an angle for an aerial vehicle according to Embodiment 3 of the present application.
Figure 4B:
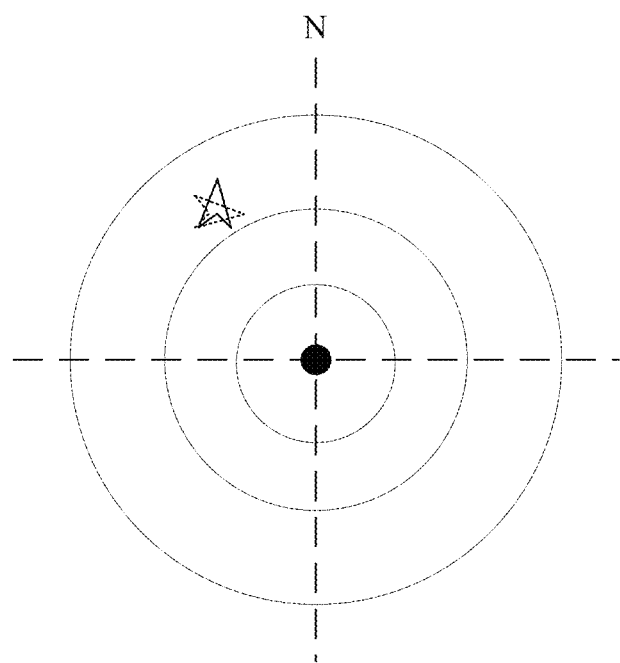
FIG. 4B is a schematic diagram of adjusting an angle for an aerial vehicle according to Embodiment 3 of the present application.
Figure 4C:
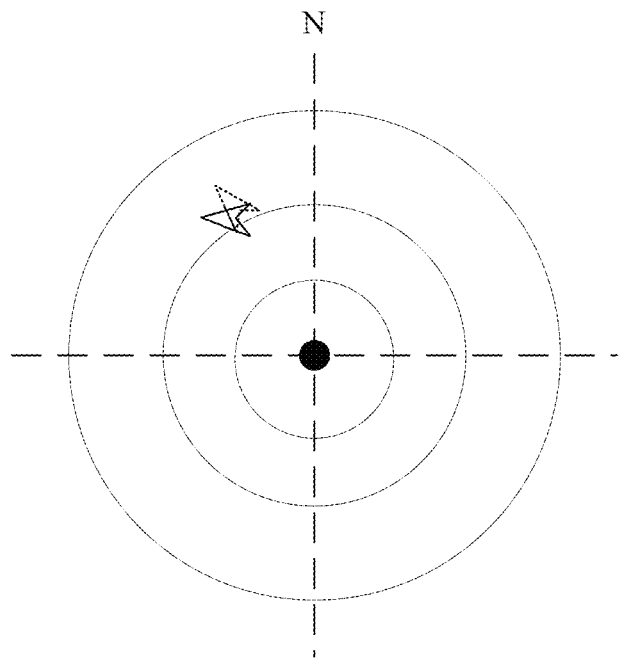
FIG. 4C is a schematic diagram of adjusting an angle for an aerial vehicle according to Embodiment 3 of the present application.

Embodiment 3 of the present application further describes Embodiment 1 and Embodiment 2 with reference to actual application, as shown in FIG. 3A, FIG. 3B and FIG. 3C and FIG. 4 A, FIG. 4B and FIG. 4C.

In actual operation, a working bench may be a remote control. In an operation manner shown in FIG. 3A, an aerial vehicle and a remote control are included. The remote control directly establishes a connection to the aerial vehicle. Flight of the aerial vehicle is controlled by using the remote control.

Optionally, in a manner that facilitates a pilot to control the aerial vehicle, when the aerial vehicle takes off and when an orientation of an aerial vehicle nose and an orientation of the pilot are inconsistent, the aerial vehicle may be automatically adjusted to have a same orientation as the pilot. When or before the aerial vehicle takes off, the aerial vehicle sends attitude information of the aerial vehicle to the remote control. The attitude information includes a heading angle. After receiving the heading angle sent by the aerial vehicle, the remote control obtains a direction angle thereof. For the direction angle of the remote control, the remote control obtains the direction angle thereof by using a GPS module or a compass module built in the remote control. The remote control determines a heading adjustment angle of the aerial vehicle by determining an angle difference between orientations of the nose and the pilot according to the heading angle of the aerial vehicle and the direction angle of the remote control. The remote control sends a heading adjustment instruction to the aerial vehicle according to the heading adjustment angle of the aerial vehicle, to adjust a heading of the aerial vehicle. A program for a process of controlling the heading of the aerial vehicle may be used as a default program after takeoff for automatic calling, or may be triggered by a user. For example, an adjustment button is configured on the remote control. When the user presses the button, the orientation of the nose is automatically adjusted to be the same as the direction of the pilot.

Still further, an input box or an input button for the target heading angle may also be configured on the remote control, so that the user can quickly make the orientation of the nose adjusted to be consistent with the direction of the pilot and the pilot enter, according to a requirement thereof, a target angle expected to be adjusted relative to a position of the pilot, and one-touch adjustment of the heading of the aerial vehicle is implemented.

In the actual operation, the working bench may be a mobile phone terminal. As shown in FIG. 3B, the mobile phone terminal establishes a connection to the aerial vehicle through WiFi or in other manners. The mobile phone terminal obtains a direction angle thereof by using a GPS or a compass that is carried by the mobile phone terminal. A specific operation manner is similar to that in FIG. 3A. Details are not described herein again. The mobile phone terminal directly operates the aerial vehicle, which facilitates carrying of the user and is very convenient to operate.

In the actual operation, the aerial vehicle may also be controlled by the remote control and the mobile phone terminal in cooperation, as shown in FIG. 3C. In practice, the remote control is often relatively simple, No GPS or compass is specially configured for the remote control. Therefore, according to this embodiment, the mobile phone terminal shares information with the remote control, to achieve the objective of the present application. In FIG. 3C, the remote control controls flight of the aerial vehicle.

The remote control establishes a connection to the aerial vehicle. The mobile phone terminal does not establish a connection to the aerial vehicle. The mobile phone terminal establishes a connection to the remote control through Bluetooth, infrared or WiFi, or in other manners. In addition, functions of the remote control are limited. Usually the remote control is only used for data transmission between the user and the aerial vehicle. Therefore, in this embodiment, complex operations are performed on the mobile phone terminal. The aerial vehicle sends the flight attitude information thereof to the remote control. After receiving the flight attitude information, the remote control forwards the flight attitude information to the mobile phone terminal. The mobile phone terminal obtains the heading angle of the aerial vehicle from the flight attitude information. The mobile phone terminal obtains the direction angle thereof as an orientation of the working bench by using the GPS or the compass that is carried by the mobile phone terminal. The mobile phone terminal calculates the heading adjustment angle of the aerial vehicle according to the heading angle and the direction angle of the mobile phone terminal. The mobile phone terminal converts the heading adjustment angle of the aerial vehicle into a heading adjustment instruction of the aerial vehicle and sends the heading adjustment instruction to the remote control. The remote control sends the adjustment instruction to the aerial vehicle, to control the aerial vehicle to adjust the heading. Certainly, the target heading angle may alternatively be entered on the mobile phone terminal, which is similar to operation in other embodiments. Details are not described herein again.

In such a manner, the mobile phone terminal is used to calculate heading adjustment, so that structures of an existing remote control and aerial vehicle are not changed furthest and implementation is very convenient.

In practice, the working bench precisely displays a position and the heading of the aerial vehicle by using the position and the heading angle of the aerial vehicle and a position and orientation information of the working bench, as shown in FIG. 4A. It is assumed that a black point in a center of coordinates is the position of the working bench and the orientation of the working bench is true north. The working bench displays obtain the position of the aerial vehicle by obtaining the GPS information of the aerial vehicle and displays the heading of the aerial vehicle by obtaining the heading angle of the aerial vehicle. As shown in FIG. 4B, the heading angle Yaw of the aerial vehicle is 0 degrees and the orientation of the working bench is 90 degrees. Then heading adjustment angle of the aerial vehicle is the heading angle Yaw, namely, 0, of the aerial vehicle minus the direction angle, namely, 90, of the working bench, which is equal to minus 90 degrees. The working bench counterclockwise adjusts the heading of the aerial vehicle by 90 degrees according to the heading adjustment angle of the aerial vehicle, namely, minus 90 degrees, so that the heading of the aerial vehicle can be adjusted to be consistent with the direction of the pilot. Certainly, in the foregoing calculation manner, alternatively, the orientation, namely, 90 degrees, of the working bench minus the heading angle Yaw, namely, 0 degrees, of the aerial vehicle is equal to positive 90 degrees. The working bench counterclockwise adjusts the heading of the aerial vehicle by 90 degrees.

When the user enters the target heading angle, the target heading angle is an angle difference between a to-be-adjusted target position and the position of the working bench. The target heading angle is a positive angle when the to-be-adjusted target position needs to be clockwise adjusted toward the working bench. The target heading angle is a negative angle when the to-be-adjusted target position needs to be counterclockwise adjusted toward the working bench. For example, a current orientation of the aerial vehicle nose is 120 degrees and the orientation of the working bench is 90 degrees. The user expects the aerial vehicle to counterclockwise rotate 90 degrees relative to the working bench, as shown in FIG. 4C. Because the user expects the aerial vehicle to counterclockwise rotate 90 degrees relative to the working bench, the target heading angle is an angle relative to the position of the working bench and is −90 degrees. The heading angle of the aerial vehicle is 120 degrees. The position of the working bench is 90 degrees. The heading adjustment angle of the aerial vehicle is: −90+120−90=−60. To be specific, the aerial vehicle nose counterclockwise rotates by 60 degrees, as shown in FIG. 4C, so that the orientation of the nose that is expected by the user is achieved.

According to Embodiment 3 of the present application, the pilot conveniently adjusts the aerial vehicle based on the direction of the working bench, operation of the pilot is facilitated, and difficulties in heading adjustment are reduced.

Embodiment 4

Figure 5:
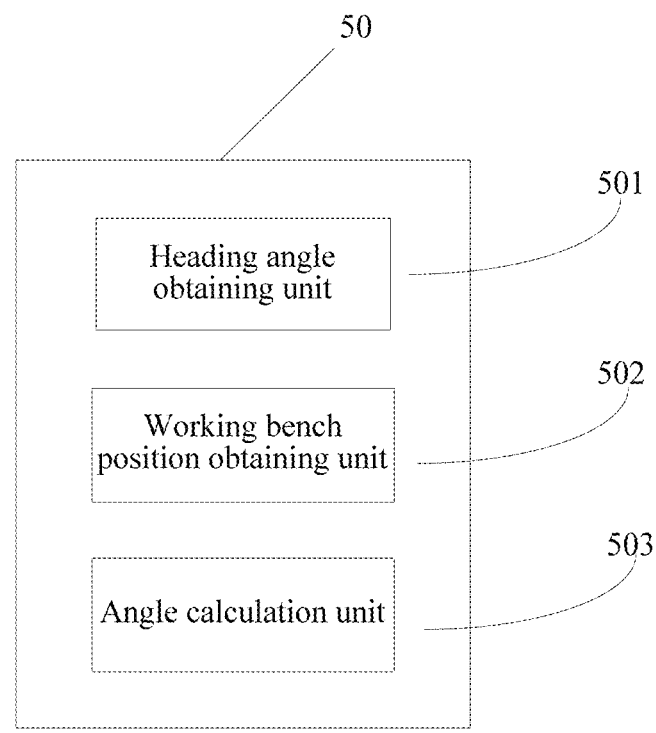
FIG. 5 is a diagram of an aerial vehicle heading control device according to Embodiment 4 of the present application.
Figure 6:
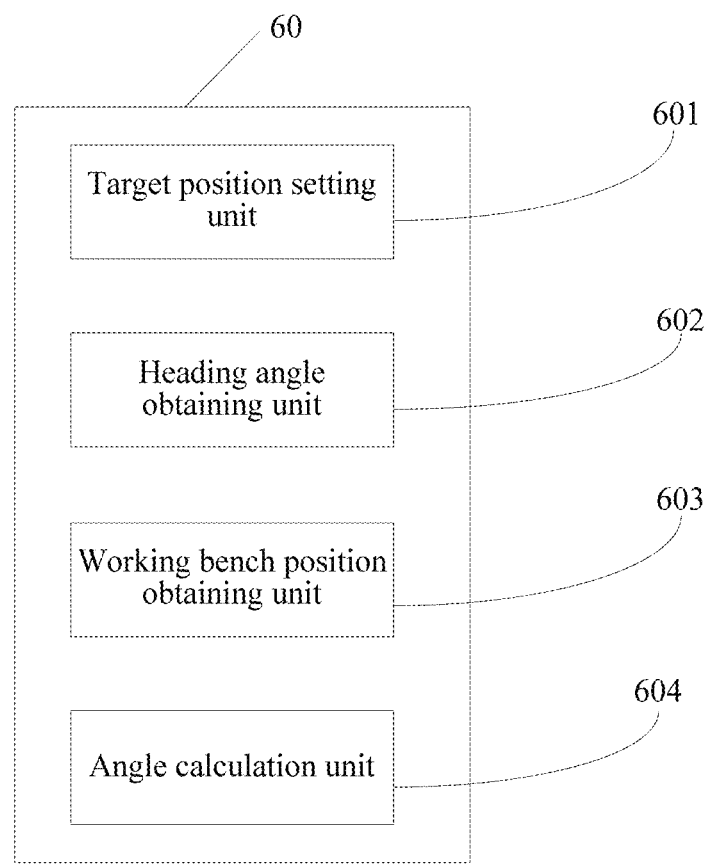
FIG. 6 is a diagram of a second aerial vehicle heading control apparatus according to Embodiment 4 of the present application.
Figure 7:
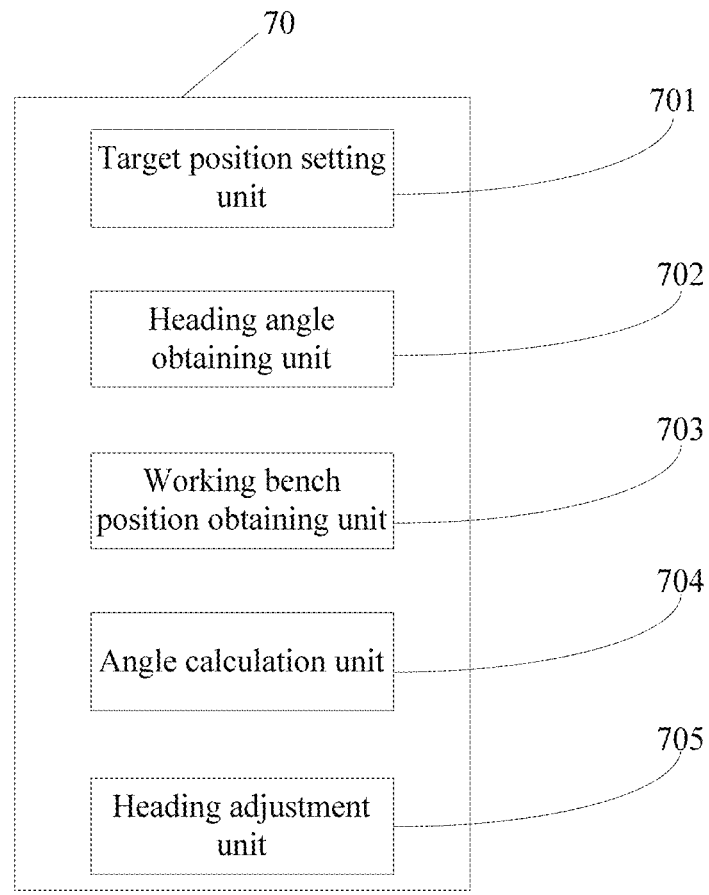
FIG. 7 is a diagram of a third aerial vehicle heading control apparatus according to Embodiment 4 of the present application.

Embodiment 4 of the present application provides an aerial vehicle heading control device 50, as shown in FIG. 5, FIG. 6, and FIG. 7. The aerial vehicle heading control device 50 includes:

a heading angle obtaining unit 501, configured to obtain a heading angle of an aerial vehicle and send the heading angle to an angle calculation unit 503, where as described in Embodiment 1, the obtaining a heading angle of an aerial vehicle includes a plurality of manners, for example, the aerial vehicle sends attitude information thereof to the heading angle obtaining unit 501 in real time; or the aerial vehicle periodically sends attitude information thereof to the heading angle obtaining unit 501; or the aerial vehicle heading control device 50 actively requests attitude information of the aerial vehicle from the aerial vehicle, after receiving the request, the aerial vehicle sends the attitude information to the heading angle obtaining unit 501 and after obtaining the heading angle, the heading angle obtaining unit 501 sends the heading angle to the angle calculation unit 503;

a working bench position obtaining unit 502, configured to obtain a direction angle of a working bench and send the direction angle to the angle calculation unit 503, the direction angle of the working bench being obtained by using GPS information or a compass module and the direction angle being sent to the angle calculation unit 503; and the angle calculation unit 503, configured to calculate a heading adjustment angle of the aerial vehicle according to the heading angle and the direction angle of the working bench.

As described in Embodiment 1, through the heading angle Yaw of the aerial vehicle minus the direction angle Degree of the working bench, the angle calculation unit 503 obtains an angle difference therebetween. The angle difference is used as the heading adjustment angle of the aerial vehicle.

Certainly, alternatively, through the direction angle Degree of the working bench minus the heading angle Yaw of the aerial vehicle, the working bench may obtain the angle difference therebetween. The angle difference is used as the heading adjustment angle of the aerial vehicle.

Any calculation manner does not affect adjustment. During adjustment, only adjustment directions are different.

Optionally, as shown in FIG. 6, the aerial vehicle heading control device further includes a target position setting unit 601, configured to receive a target heading angle and send the target heading angle to an angle calculation unit 604.

The angle calculation unit 604 receives the target heading angle and calculates the heading adjustment angle of the aerial vehicle according to the target heading angle, the heading angle of the aerial vehicle and the direction angle of the working bench. Specifically, the adjustment angle is obtained through the target heading angle plus the heading angle of the aerial vehicle minus the direction angle of the working bench.

Optionally, as shown in FIG. 7, the aerial vehicle heading control device further includes a heading adjustment unit 705, configured to receive a heading adjustment angle of the aerial vehicle that is sent by an angle calculation unit 704 and send a heading adjustment instruction to the aerial vehicle according to the heading adjustment angle of the aerial vehicle, to adjust a heading of the aerial vehicle.

When through the heading angle Yaw of the aerial vehicle minus the direction angle Degree of the working bench, the angle calculation unit obtains an angle difference therebetween and the angle difference is used as the heading adjustment angle of the aerial vehicle, the aerial vehicle is adjusted clockwise when the angle difference is a positive value; and the aerial vehicle is adjusted counterclockwise when the angle difference is a negative value.

When through the direction angle Degree of the working bench minus the heading angle Yaw of the aerial vehicle, the working bench obtains an angle difference therebetween and the angle difference is used as the heading adjustment angle of the aerial vehicle, the aerial vehicle is adjusted clockwise when the angle difference is a negative value; and the aerial vehicle is adjusted counterclockwise when the angle difference is a positive value.

Optionally, the heading adjustment unit further includes: skipping performing adjustment when the heading adjustment angle of the aerial vehicle is less than a preset threshold; and performing adjustment when the heading adjustment angle of the aerial vehicle is greater than the preset threshold. For example, when the heading adjustment angle of the aerial vehicle is within 5 degrees, no adjustment is performed. It may be understood that, the threshold may further be set to values other than 5 degrees according to a specific application scenario and is not strictly limited herein. The threshold is preset in a system; certainly, the user may reset the threshold through a setting operation. The threshold is set so that the heading of the aircraft can be furthest ensured not to be frequently adjusted and flight stability is ensured.

According to Embodiment 4 of the present application, a pilot conveniently adjusts the aerial vehicle based on the direction of the working bench, operation of the pilot is facilitated, and difficulties in heading adjustment are reduced.

Embodiment 5

Figure 8:
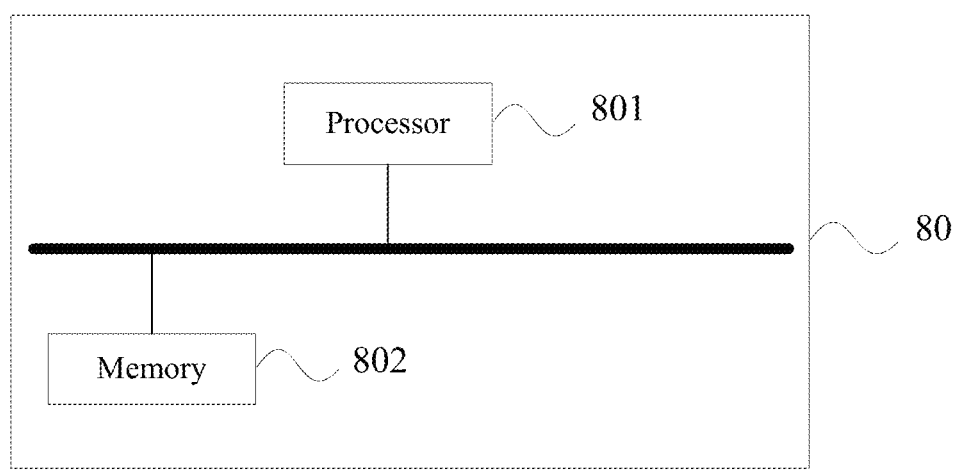
FIG. 8 is a structural diagram of an electronic device according to Embodiment 5 of the present application.

FIG. 8 is a schematic structural diagram of an electronic device according to an embodiment of the present application. As shown in FIG. 8, an electronic device 80 includes one or more processors 801 and a memory 802. In FIG. 8, one processor 801 is used as an example.

The processor 801 may be connected to the memory 802 by using a bus or in another manner. In FIG. 8, that the processor 801 is connected to the memory 802 by using the bus is used as an example.

The memory 802, as a non-volatile the computer readable storage medium, is configured to store a non-volatile software program, a non-volatile computer executable program and a module, for example, a program instruction/module (for example, the modules shown in FIG. 5, FIG. 6, and FIG. 7) corresponding to the aerial vehicle heading control method in the embodiments of the present application. The processor 801 runs the non-volatile software program, the instruction and the module that are stored in the memory 802, so that various function applications and data processing of an aerial vehicle heading control device, that is, functions of the modules in the method embodiments and the apparatus embodiments, are implemented.

The memory 802 may include a high-speed random access memory and may further include a non-volatile memory such as at least one magnetic disk storage device, a flash memory device, or other non-volatile solid storage devices.

The program instruction/module is stored in the memory 802. When the program instruction/module is executed by the one or more processors 801, the aerial vehicle heading control method in any of the method embodiments is performed. For example, the foregoing described steps shown in FIG. 1 and FIG. 2 are performed; and the modules in FIG. 5, FIG. 6, and FIG. 7 can also be implemented.

The electronic device 80 in this embodiment of the present application exists in various forms. When the foregoing described steps shown in FIG. 1 and FIG. 2 are performed and the modules in FIG. 5, FIG. 6, and FIG. 7 can also be implemented, the electronic device 80 includes but is not limited to:

(1) A mobile communications device: a feature of such a device is having a mobile communication function and a main objective is to provide voice and data communication. Such a terminal includes a smartphone (for example, iPhone), a multimedia mobile phone, a functional mobile phone and a low-end mobile phone.

(2) An ultra mobile personal computer device: such a device belongs to the scope of a personal computer, has computing and processing functions and usually has a mobile Internet feature. Such a terminal includes a PDA, an MID, a UMPC device or the like, for example, an iPad.

(3) A remote control: such a device may be configured to control flight of an aerial vehicle.

An embodiment of the present application further provides a non-volatile computer storage medium. The computer storage medium stores a computer executable instruction. The computer executable instruction is executed by one or more processors, for example, one processor 801 in FIG. 8, so that the one or more processors can perform the aerial vehicle heading control method in any of the method embodiments.

Through the description of the foregoing implementations, a person skilled in the art can clearly learn that the implementations can be implemented by using software and a general-purpose hardware platform and certainly can be implemented by using hardware. Based on such understanding, the technical solution substantially or the part contributing to the prior art can be reflected in the form of software product. The computer software product can be stored in the computer readable storage medium, such as ROM/RAM, diskette and compact disc and include several instructions that make a computer device (which may be a personal computer, a server, a network device or the like) perform the embodiments or the methods described in some parts of the embodiments.

Finally it should be noted that the foregoing embodiments are merely used to describe the technical solutions of the present application and are not intended to limit the present application. Under the concept of the present application, technical features of the foregoing embodiments or different embodiments may be combined. The steps may be implemented in any sequence. Many other changes of different aspects of the present application as above exist. For simplicity, they are not provided in the details. Although the present application is described in detail with reference to the foregoing embodiments, a person of ordinary skill in the art should understand that they may still make modifications to the technical solutions recorded in the foregoing embodiments or make equivalent replacements to some technical features thereof, as long as such modifications or replacements do not cause the essence of corresponding technical solutions to depart from the scope of the technical solutions of the embodiments of the present application.

What is claimed is:

1. An aerial vehicle heading control method, comprising:
obtaining a heading angle of an aerial vehicle;
obtaining a direction angle of a working bench;
calculating a heading adjustment angle of the aerial vehicle according to the heading angle of the aerial vehicle and the direction angle of the working bench; and
adjusting a heading of the aerial vehicle according to the heading adjustment angle of the aerial vehicle when the absolute value of heading adjustment angle of the aerial vehicle is greater than a preset threshold, and skipping performing adjustment when the absolute value of heading adjustment angle of the aerial vehicle is less than a preset threshold.

2. The aerial vehicle heading control method according to claim 1, wherein the obtaining the heading angle of the aerial vehicle comprises: receiving flight attitude information sent by the aerial vehicle and obtaining the heading angle of the aerial vehicle from the flight attitude information.

3. The aerial vehicle heading control method according to claim 1, wherein the obtaining the heading angle of the aerial vehicle comprises: receiving, as the heading angle of the aerial vehicle, a direction angle that is of an aerial vehicle nose relative to a compass and that is sent by the aerial vehicle.

4. The aerial vehicle heading control method according to claim 1, the direction angle of the working bench is a direction angle directly obtained from GPS information of the working bench or an angle of the working bench relative to a compass.

5. The aerial vehicle heading control method according to claim 1, wherein the heading adjustment angle of the aerial vehicle is a difference between the heading angle of the aerial vehicle and the direction angle of the working bench.

6. The aerial vehicle heading control method according to claim 5, wherein the adjusting the heading of the aerial vehicle according to the heading adjustment angle of the aerial vehicle, comprises: adjusting, the heading of the aerial vehicle counterclockwise according to the heading adjustment angle of the aerial vehicle when the heading adjustment angle of the aerial vehicle is a negative value; or adjusting, the heading of the aerial vehicle clockwise according to the heading adjustment angle of the aerial vehicle when the heading adjustment angle of the aerial vehicle is a positive value.

7. The aerial vehicle heading control method according to claim 1, wherein the heading adjustment angle of the aerial vehicle is a difference between the direction angle of the working bench and the heading angle of the aerial vehicle.

8. The aerial vehicle heading control method according to claim 7, wherein the adjusting the heading of the aerial vehicle according to the heading adjustment angle of the aerial vehicle, comprises: adjusting, the heading of the aerial vehicle counterclockwise according to the heading adjustment angle of the aerial vehicle when the heading adjustment angle of the aerial vehicle is a positive value; or adjusting, the heading of the aerial vehicle clockwise according to the heading adjustment angle of the aerial vehicle when the heading adjustment angle of the aerial vehicle is a negative value.

9. The aerial vehicle heading control method according to claim 1, wherein before the obtaining the heading angle of an aerial vehicle, the method further comprises obtaining a target heading angle, the target heading angle being an angle difference between a to-be-adjusted target position and a position of the working bench, the target heading angle being a positive angle when the to-be-adjusted target position needs to be clockwise adjusted toward the working bench, and the target heading angle being a negative angle when the to-be-adjusted target position needs to be counterclockwise adjusted toward the working bench.

10. The aerial vehicle heading control method according to claim 9, wherein the heading adjustment angle of the aerial vehicle is the target heading angle plus the heading angle of the aerial vehicle minus the direction angle of the working bench.

11. The aerial vehicle heading control method according to claim 10, the adjusting the heading of the aerial vehicle according to the heading adjustment angle of the aerial vehicle comprises: adjusting, the heading of the aerial vehicle counterclockwise according to the heading adjustment angle of the aerial vehicle when the heading adjustment angle of the aerial vehicle is a negative value.

12. The aerial vehicle heading control method according to claim 10, the adjusting the heading of the aerial vehicle according to the heading adjustment angle of the aerial vehicle comprises: adjusting, the heading of the aerial vehicle clockwise according to the heading adjustment angle of the aerial vehicle when the heading adjustment angle of the aerial vehicle is a positive value.

13. The aerial vehicle heading control method according to claim 9, wherein the target heading angle comprises heading angles corresponding to the following flight actions executed by the aerial vehicle: going straight relative to the working bench, turning left 90 degrees relative to the working bench, turning right 90 degrees relative to the working bench and turning round relative to the working bench.

14. The aerial vehicle heading control method according to claim 1, further comprising: when an absolute value of the heading adjustment angle of the aerial vehicle is less than a preset threshold, skipping performing adjustment of the heading of the aerial vehicle; otherwise, adjusting the heading of the aerial vehicle.

\* \* \* \* \*